United States Patent
Petrowski et al.

(10) Patent No.: US 10,065,605 B1
(45) Date of Patent: Sep. 4, 2018

(54) MULTIPLE WIPER BLADE SYSTEM AND ASSEMBLY

(71) Applicant: C&Z 3-IN-1 Wiper System LLC, Wausau, WI (US)

(72) Inventors: Cara Petrowski, Wausau, WI (US); Zoltan Ezer, Antigo, WI (US)

(73) Assignee: C&Z 3-IN-1 Wiper System LLC, Wausau, WI (US)

( * ) Notice: Subject to any disclaimer, the term of this patent is extended or adjusted under 35 U.S.C. 154(b) by 0 days.

(21) Appl. No.: 15/601,657

(22) Filed: May 22, 2017

Related U.S. Application Data

(60) Provisional application No. 62/430,790, filed on Dec. 6, 2016.

(51) Int. Cl.
| | |
|---|---|
| *B60S 1/40* | (2006.01) |
| *B60S 1/52* | (2006.01) |
| *B60S 1/28* | (2006.01) |
| *B60S 1/34* | (2006.01) |
| *B60S 1/38* | (2006.01) |

(52) U.S. Cl.
CPC ............. *B60S 1/28* (2013.01); *B60S 1/345* (2013.01); *B60S 1/3415* (2013.01); *B60S 1/3429* (2013.01); *B60S 1/3431* (2013.01); *B60S 1/3436* (2013.01); *B60S 1/3447* (2013.01); *B60S 1/4003* (2013.01); *B60S 1/4009* (2013.01); *B60S 1/4019* (2013.01); *B60S 1/4074* (2013.01); *B60S 1/4077* (2013.01); *B60S 1/3445* (2013.01); *B60S 1/524* (2013.01); *B60S 2001/3832* (2013.01)

(58) Field of Classification Search
CPC .. B60S 1/38; B60S 1/40; B60S 1/3801; B60S 1/4009; B60S 1/4077; B60S 1/4074; B60S 1/4016; B60S 1/4019; B60S 1/524; B60S 2001/3831; B60S 2001/3832; B60S 1/28; B60S 1/3415; B60S 1/4003; B60S 1/4006; B60S 1/4067; B60S 2001/3837; B60S 2001/4022
USPC .............................. 15/250.32, 250.41, 250.4
See application file for complete search history.

(56) References Cited

U.S. PATENT DOCUMENTS

| | | |
|---|---|---|
| 1,953,703 A | 4/1934 | Dirienzo et al. |
| 2,085,608 A | 6/1937 | Rodrick et al. |
| (Continued) | | |

FOREIGN PATENT DOCUMENTS

| | | | |
|---|---|---|---|
| FR | 2437961 | * | 4/1980 |
| FR | 2985700 A1 | | 7/2013 |

*Primary Examiner* — Gary Graham
(74) *Attorney, Agent, or Firm* — Boardman & Clark LLP

(57) ABSTRACT

A multiple windshield wiper assembly is disclosed. The multiple windshield wiper assembly may comprise a first wiper assembly having a squeegee blade; a second wiper assembly having a scraper blade, the second wiper assembly being coupled to the first wiper assembly by a windshield wiper assembly connector; wherein the scraper blade comprises an attachment surface for engaging a wiper assembly, a scraper surface for engaging a windshield, a channel for conducting wiper fluid, a plurality of apertures for disbursement of the wiper fluid onto a windshield, and a water connection fitting for connection of the scraper blade to a vehicle water supply hose. A number of embodiments of a windshield wiper assembly connector for use in connecting one or more windshield wiper assemblies to pin-type and hookslot-type wiper arms are also disclosed.

10 Claims, 8 Drawing Sheets

(56) References Cited

U.S. PATENT DOCUMENTS

| | | | | |
|---|---|---|---|---|
| 2,203,071 | A | 6/1940 | Zaiger et al. | |
| 2,273,817 | A | 2/1942 | Chellew et al. | |
| 2,918,689 | A * | 12/1959 | Pruett | B60S 1/524 118/266 |
| 3,138,816 | A | 6/1964 | Abodeely et al. | |
| 3,631,561 | A | 1/1972 | Aszkenas | |
| 3,638,274 | A | 2/1972 | Farver | |
| 3,667,083 | A | 6/1972 | Linker | |
| 3,757,377 | A | 9/1973 | Hayhurst | |
| 3,892,006 | A | 7/1975 | Yasumoto | |
| 3,906,583 | A | 9/1975 | Murphy | |
| 3,958,295 | A | 5/1976 | Green et al. | |
| 4,177,538 | A | 12/1979 | Blaiklock et al. | |
| 4,214,343 | A * | 7/1980 | Dudek | B60S 1/4006 15/250.32 |
| 4,339,839 | A | 7/1982 | Knights et al. | |
| 4,611,364 | A | 9/1986 | Grubner et al. | |
| 4,649,593 | A | 3/1987 | Gilliam, III et al. | |
| 4,719,661 | A | 1/1988 | Hanselmann et al. | |
| 4,745,653 | A | 5/1988 | Bliznak | |
| 5,065,474 | A * | 11/1991 | Charng | B60S 1/40 15/250.31 |
| 5,084,933 | A | 2/1992 | Buechele | |
| 5,168,595 | A | 12/1992 | Naylor et al. | |
| 5,235,720 | A | 8/1993 | Kinder et al. | |
| 5,255,407 | A | 10/1993 | Yang et al. | |
| 5,289,608 | A | 3/1994 | Kim | |
| 5,301,384 | A | 4/1994 | Perry et al. | |
| 5,327,615 | A | 7/1994 | Green et al. | |
| 5,332,328 | A | 7/1994 | Yang et al. | |
| 5,392,487 | A | 2/1995 | Yang | |
| 5,406,672 | A | 4/1995 | Hipke et al. | |
| 5,442,834 | A | 8/1995 | Perry | |
| 5,611,103 | A | 3/1997 | Lee | |
| 5,618,124 | A | 4/1997 | Chen | |
| 5,778,483 | A | 7/1998 | Dawson et al. | |
| 5,802,661 | A | 9/1998 | Miller et al. | |
| 5,885,023 | A | 3/1999 | Powell et al. | |
| 5,996,168 | A | 12/1999 | Watkins et al. | |
| 6,279,193 | B1 | 8/2001 | Cheng | |
| 6,505,378 | B1 | 1/2003 | Squires et al. | |
| 6,640,380 | B2 | 11/2003 | Rosenstein et al. | |
| 6,665,904 | B1 | 12/2003 | Kerchaert et al. | |
| 7,111,355 | B1 * | 9/2006 | Sorensen | B60S 1/3801 15/250.04 |
| 7,341,396 | B2 | 3/2008 | Huang | |
| 7,707,681 | B1 | 5/2010 | Cabak et al. | |
| 7,735,184 | B2 | 6/2010 | Westbrook et al. | |
| 8,281,454 | B1 | 10/2012 | Jordan et al. | |
| 8,381,348 | B2 | 2/2013 | Egner-Walter et al. | |
| 8,715,421 | B2 | 5/2014 | Nelson | |
| 8,745,814 | B2 | 6/2014 | Nelson | |
| 8,898,849 | B2 | 12/2014 | Bouguerra et al. | |
| 9,003,594 | B2 | 4/2015 | Guidez | |
| 9,260,085 | B2 | 2/2016 | Bex et al. | |
| 9,505,380 | B2 | 11/2016 | Tolentino et al. | |
| 2006/0000044 | A1 | 1/2006 | De et al. | |
| 2007/0094831 | A1 | 5/2007 | Huguley et al. | |
| 2007/0186366 | A1 | 8/2007 | Ailey | |
| 2008/0086830 | A1 | 4/2008 | Kim | |
| 2008/0276402 | A1 | 11/2008 | Chaise et al. | |
| 2011/0005020 | A1 | 1/2011 | Koppen et al. | |
| 2012/0096667 | A1 | 4/2012 | Cooper et al. | |
| 2012/0284948 | A1 | 11/2012 | Guidez et al. | |
| 2013/0180545 | A1 * | 7/2013 | Nelson | B60S 1/08 134/6 |
| 2014/0259508 | A1 | 9/2014 | Ranucci et al. | |
| 2015/0203073 | A1 | 7/2015 | Schaeuble | |
| 2015/0217730 | A1 | 8/2015 | Boland | |
| 2016/0016540 | A1 | 1/2016 | Wilgosz | |
| 2016/0031419 | A1 | 2/2016 | Nelson | |
| 2016/0129890 | A1 | 5/2016 | Thebault et al. | |
| 2016/0144832 | A1 | 5/2016 | Barret et al. | |

* cited by examiner

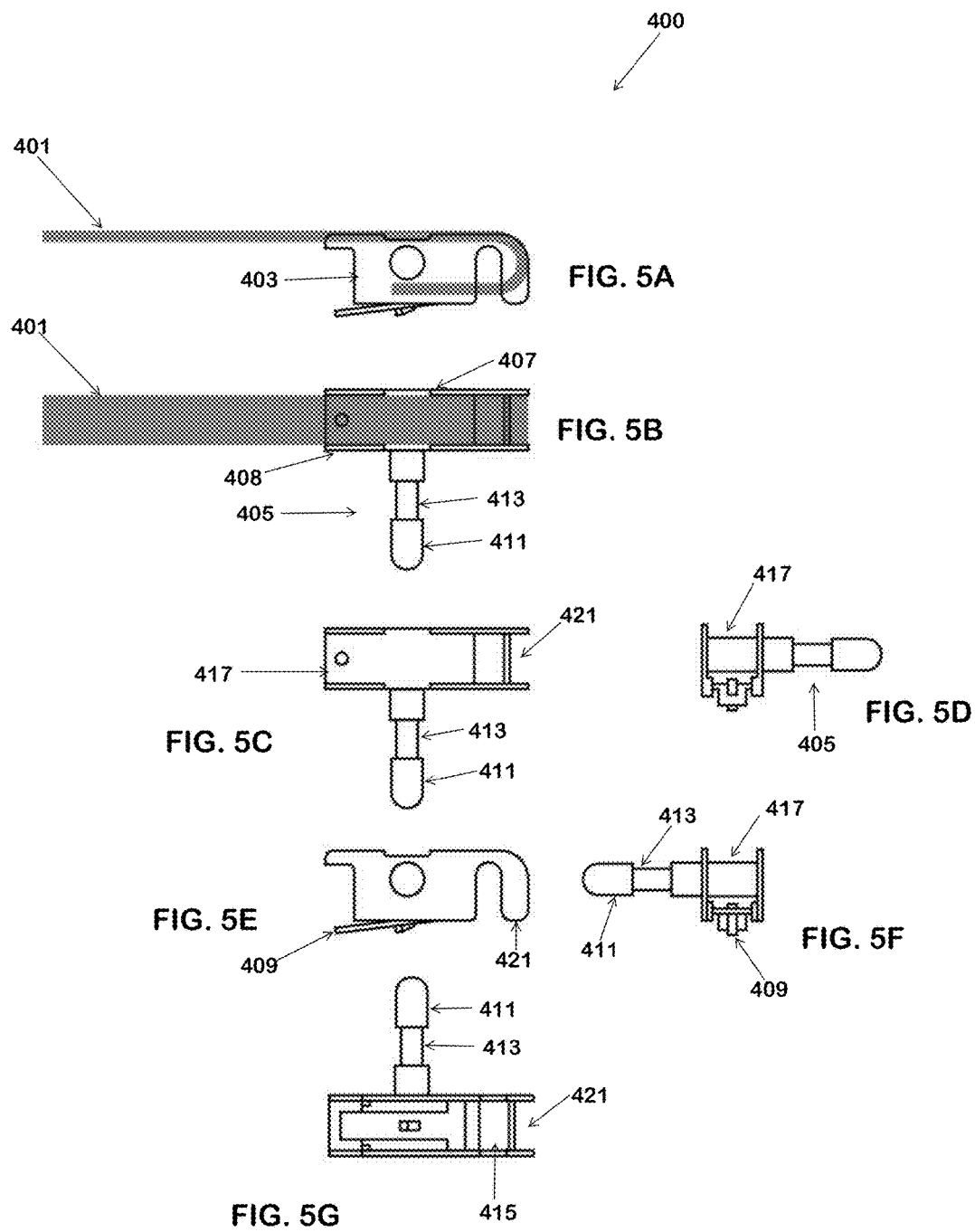

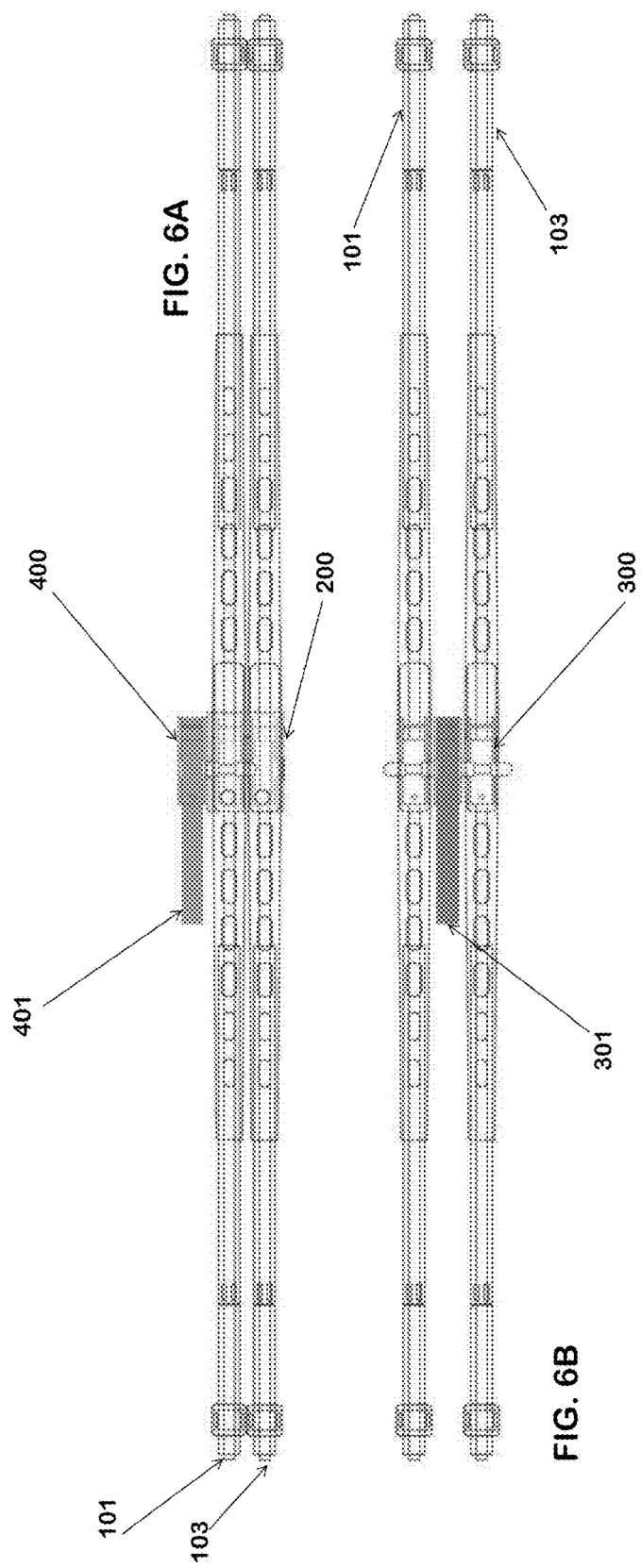

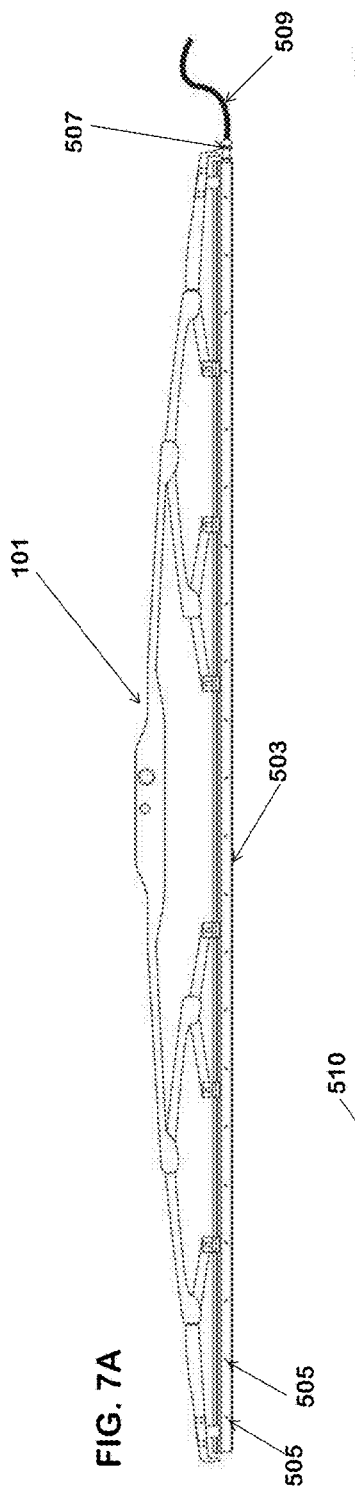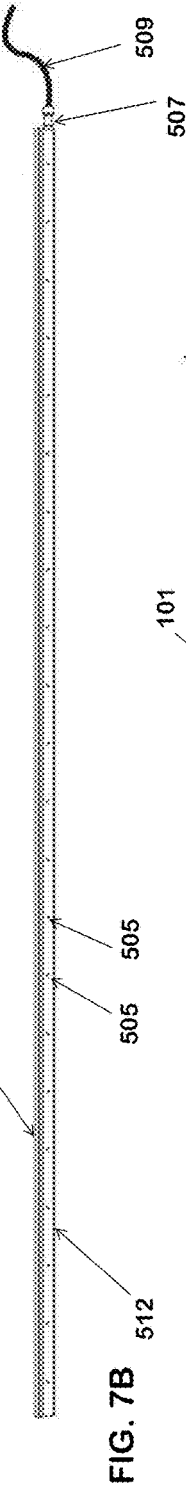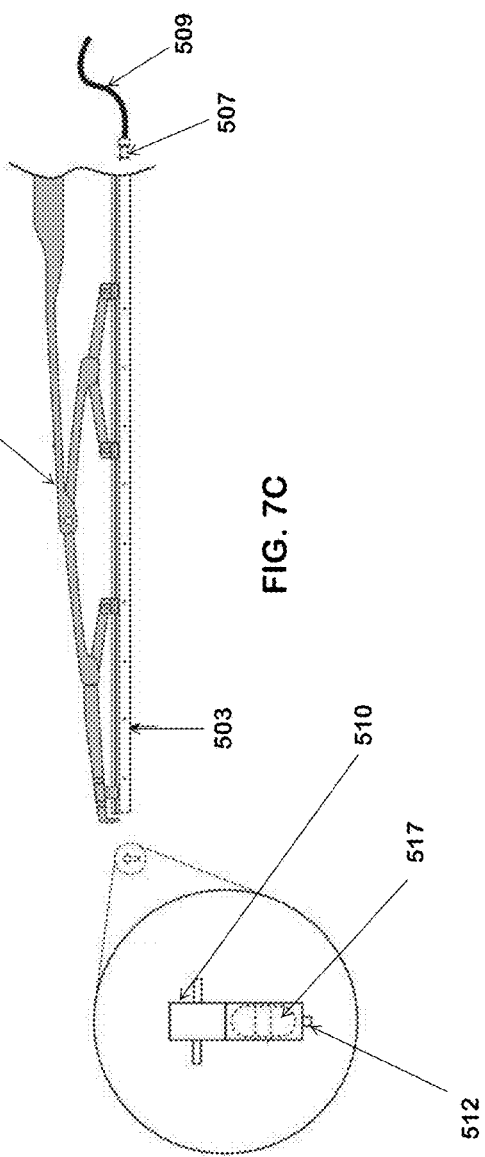

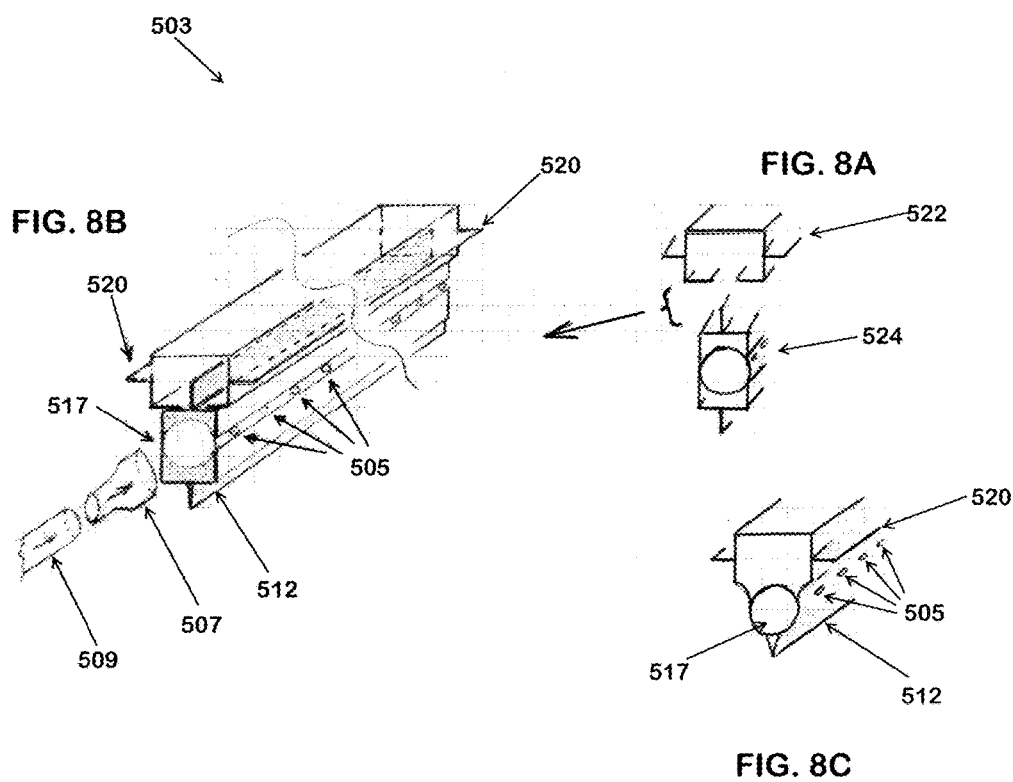

MULTIPLE WIPER BLADE SYSTEM AND ASSEMBLY

CROSS-REFERENCE TO RELATED APPLICATIONS

This application claims priority to U.S. Provisional Patent Application Ser. No. 62/430,790, filed Dec. 6, 2016, entitled MULTIPLE WIPER BLADE SYSTEM AND ASSEMBLY, the entire contents of which is hereby incorporated by reference herein in its entirety.

FIELD

This disclosure relates to wiper systems for motor vehicles. More specifically, this disclosure facilitates the provision of multiple wiper blades and assemblies on a motor vehicle.

BACKGROUND

Windshield wipers are a standard feature on almost all vehicles. Windshield wipers maintain driver visibility by removing rain, ice, snow, bugs, and other debris from the windshield which can obstruct a driver's field of vision. In order to facilitate the removal of such debris, known vehicles usually provide for a wiper fluid sprayer. The fluid facilitates the dislodging of debris and ice by the windshield wiper.

However, presently provided and readily available windshield wiper systems (including the sprayer) have various drawbacks. Specifically, known windshield wipers are frequently inadequate at removal of debris and ice, leading to obscured driver vision. As a result, many gasoline/diesel service facilities provide for windshield cleaning stations. This requires drivers to access service facilities for a quick, frequently unnecessary and additional, stop to scrub their windshield to remove the hard-stuck debris. In addition, the driver may decide to pay for a car wash, which can grow particularly expensive over time.

The debris may be particularly adhered after extended driving with the debris on the windshield. While known commercially-available wiper assemblies may be efficient at removal of some rain and some light debris, these assemblies are significantly less efficient at removal of larger or more stubborn debris and ice. This problem is often substantially more acute for large trucks, since tractors, buses and recreational vehicles, which all frequently have more vertical windshields which more directly impact bugs and other airborne debris, and the height of their windshields makes manual washing and scraping more difficult for the vehicle operator.

Other mechanisms have been proposed to help with these problems, for example, providing for different blade textures, multiple automated blade assemblies, and other systems. However, known systems are complex, cumbersome, expensive to produce, and not widely available or acceptable to auto manufacturers. Known systems may, in various embodiments, require replacement of the entire blade assembly system. These systems may put burdens on manufacturers and consumers. Manufacturers may be required to implement additional complexity in their existing production line to manufacture these systems. For example, some known systems require motors, electronics, and mechanical components as part of the blade assembly, adding additional complexity and cost in an attempt to overcome the deficiencies of known wiper blade systems noted above. Replacement of these assemblies presents complexity and cost issues to consumers as well.

What is needed is a solution to the long-felt problems presented by known wiper blades that is quick and easy to install, cost-effective, works efficiently, and is manufacturing-friendly.

SUMMARY OF THE INVENTION

Accordingly, the disclosed multiple wiper blade system and assembly addresses these and other issues.

The disclosed system and assembly provides connectors, in various embodiments, which facilitate the quick installation of one or more additional wiper blade assemblies onto a vehicle's established wiper arm system. In addition, the disclosed system and method, in various embodiments, allows for the use of a scraper blade with a fluid conductivity feature. Therefore, the disclosed system and method will allow for two or more wiper blade assemblies to work in tandem to both scrape and wipe debris from a windshield. In addition, the disclosed system and method allows for the use of a scraper blade which is strategically positioned to uniformly distribute water or windshield wiper fluid along the entire working length of the wiper and scraper blade. The disclosed system and assembly advantageously provides mechanism and structure compatible with mechanisms known to consumers for the installation of single-blade wiper systems, but with the additional advantages imparted by multi-blade systems. In addition, manufacturing mechanisms may be used to produce the disclosed system and assembly which are compatible with conventional single-blade wiper systems.

In contrast to known multi-blade assemblies, the disclosed wiper blade system and assembly can use conventional manufacturing techniques for production. This system results in a cost-effective and consumer-friendly implementation with advantages over known blade assemblies and effectively address known disadvantages noted above.

Provided herein is a multiple windshield wiper assembly comprising: a first wiper assembly having a squeegee blade; a second wiper assembly having a scraper blade, the second wiper assembly being coupled to the first wiper assembly by a windshield wiper assembly connector; wherein the scraper blade comprises an attachment surface for engaging a wiper assembly, a scraper surface for engaging a windshield, a channel for conducting wiper fluid, a plurality of apertures for disbursement of the wiper fluid onto a windshield, and a water connection fitting for connection of the scraper blade to a vehicle water supply hose.

Also provide herein is a windshield wiper assembly connector for use in connecting one or more windshield wiper assemblies to a pin-type wiper arm, the connector comprising: two pairs of sidewalls, each sidewall defining an aperture sized to receive a pin of a pin-type wiper arm; a top surface engaging the two pairs of sidewalls and having a first and second receiving overhang; a moveable beam positioned relative to the apertures so that the beam engages the pin of the pin-type wiper arm when the pin is received in the holes to secure the connector to the pin-type wiper arm; a push-button release for disengaging the moveable beam to enable release of the clip from a pin-type wiper arm; a first receiving extension sized to receive a connection feature of a first wiper assembly and a second receiving extension sized to receive a connection feature of a second wiper assembly; wherein the first and second receiving extension feature a first and second internal surface for attachment of the first wiper assembly and second wiper assembly.

In addition, disclosed herein is a windshield wiper assembly connector for use in connecting one or more windshield wiper assemblies to a hookslot-type wiper arm, the connector comprising: a first sidewall coupled to a first pin; a second sidewall coupled to a second pin; a top surface engaging the two sidewalls; a first receiving extension sized to receive a connection feature of a first wiper assembly and a second receiving extension sized to receive a connection feature of a second wiper assembly; wherein the first and second pin each have a groove; and wherein the first sidewall, second sidewall, and top surface define a hook-engaging channel.

BRIEF DESCRIPTION OF THE DRAWINGS

FIGS. 5A-5G show a breakdown of FIG. 2C showing a single connection assembly with book arm, according to various embodiments.

FIGS. 6A and 6B show drawings of two sets of two wiper blade assemblies on the clips.

FIGS. 7A-7C show a breakdown of FIG. 2D showing a wiper/scraper assembly including a scraper blade attached to a wiper blade assembly, according to various embodiments.

FIGS. 8A-8C show drawings of various embodiments of a scraper blade, according to various examples of embodiments.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring now to the Figures, wherein like views are provided with like numerals, various embodiments of the multiple wiper blade system and assembly are disclosed.

Figure 1:
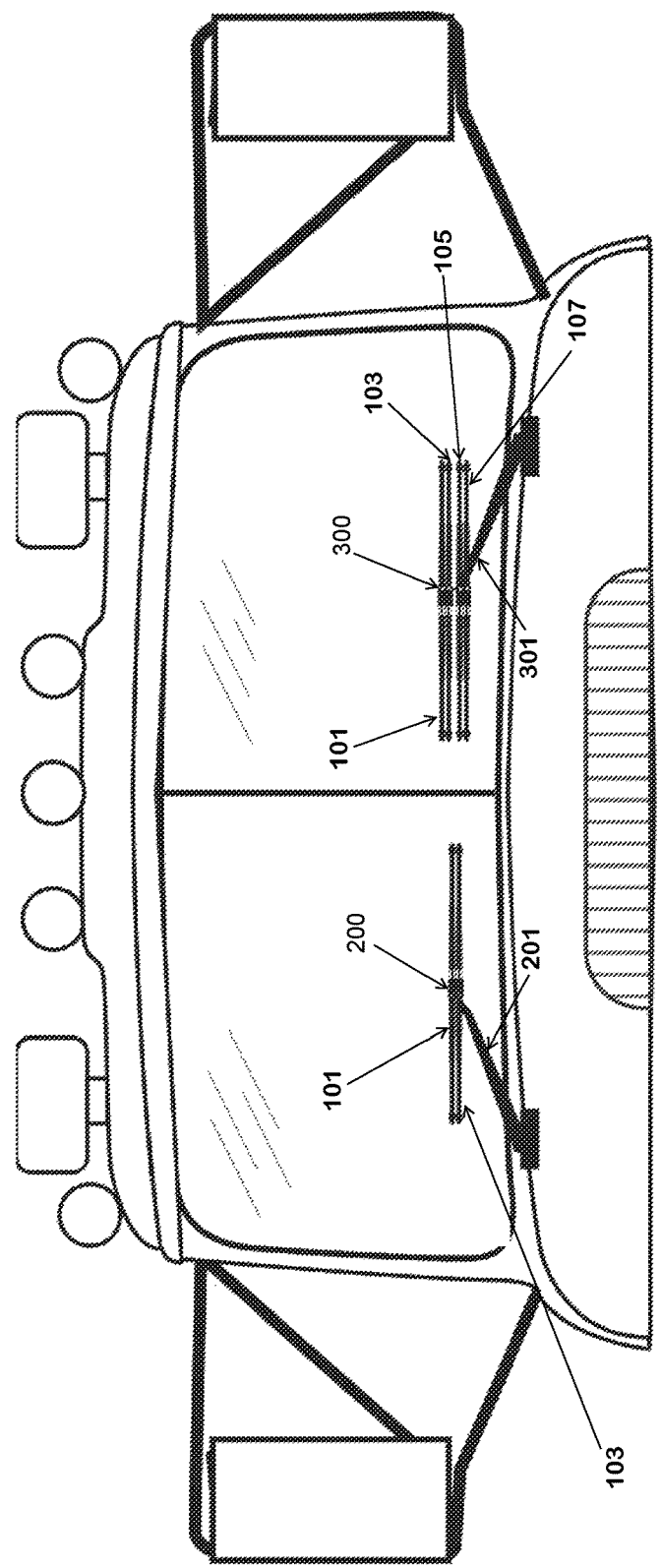
FIG. 1 shows a truck having multiple-blade assemblies installed, according to various exemplary embodiments of applicant's improved wiper system and assembly.
Figure 2A:
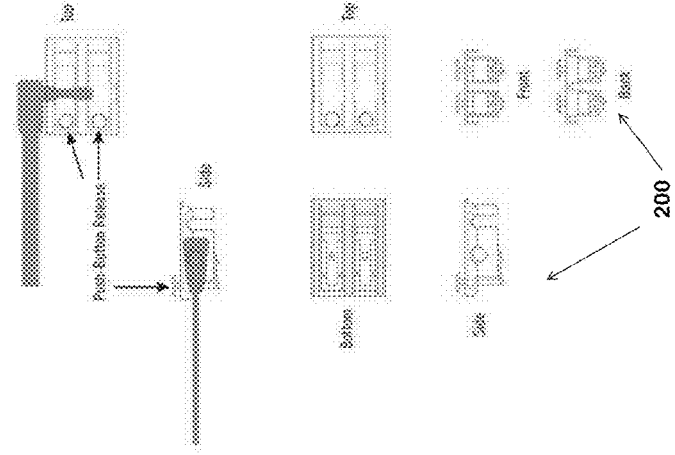
FIGS. 2A-2D show various exemplary embodiments of the assembly, including various views of a single connection assembly, a butterfly connection clip with hook arm, a double connection assembly with post arm, and a scraper blade having an integrated water channel.
Figure 2B:
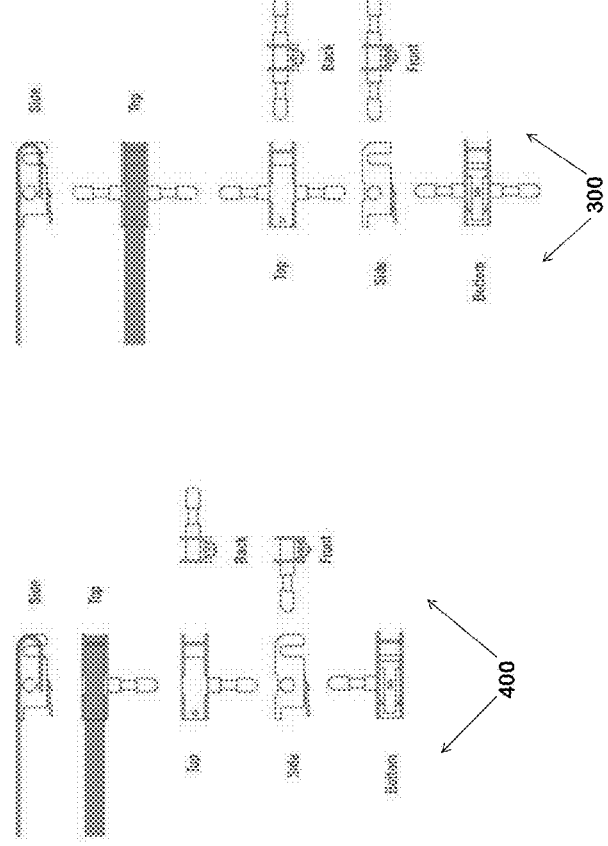
Figure 2C:
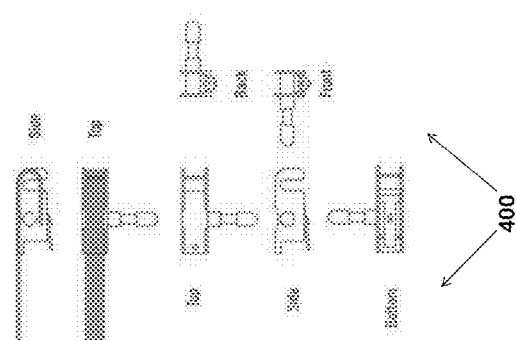
Figure 2D:
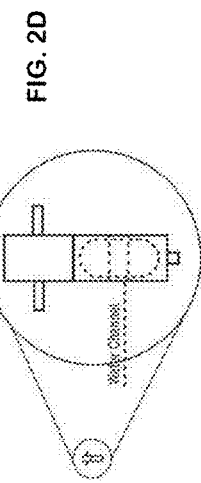
Figure 3A:
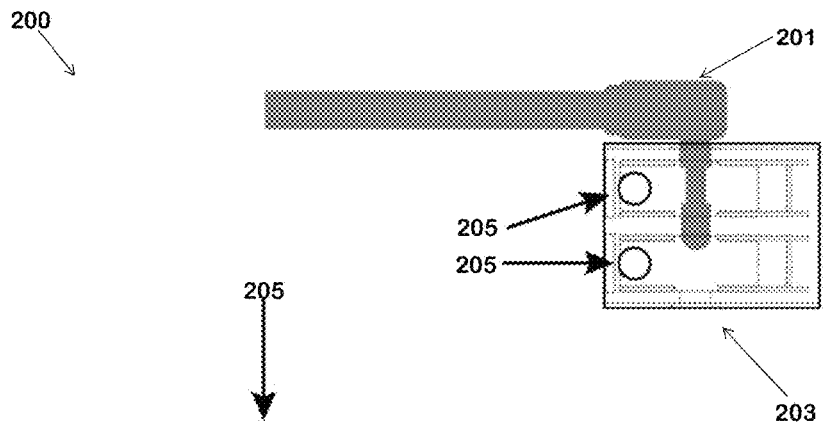
FIGS. 3A-3G show a breakdown of FIG. 2A showing the double connection assembly with post arm, according to various embodiments.
Figure 3B:
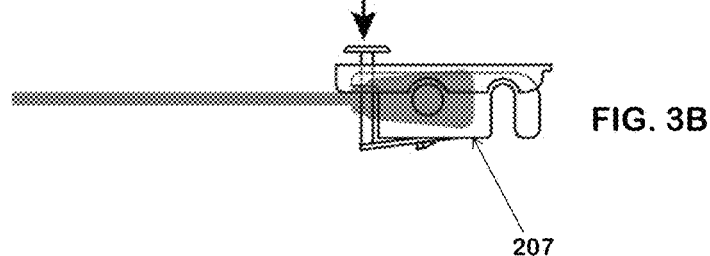
Figure 3C:
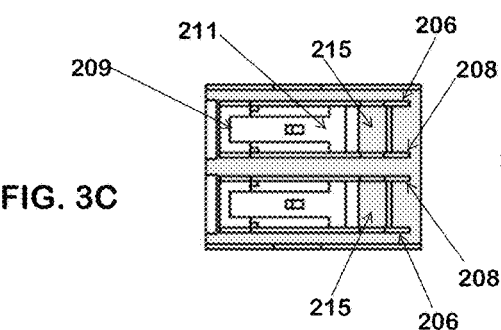
Figure 3D:
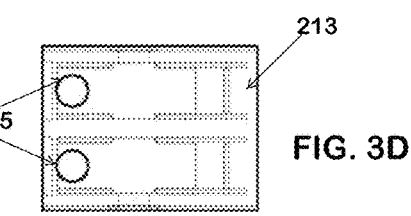
Figure 3E:
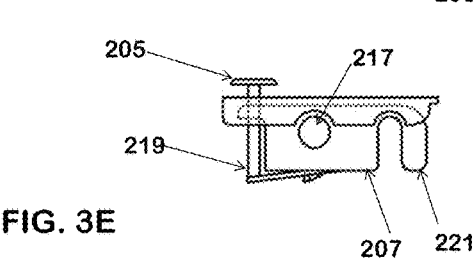
Figure 3F:
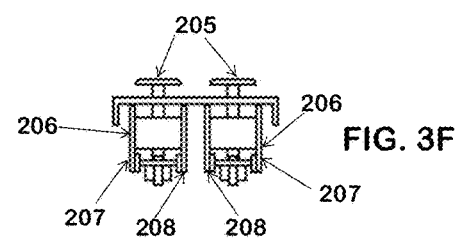
Figure 3G:
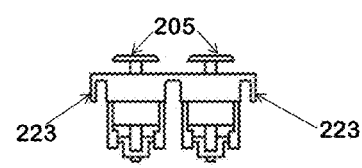
Figure 4A:
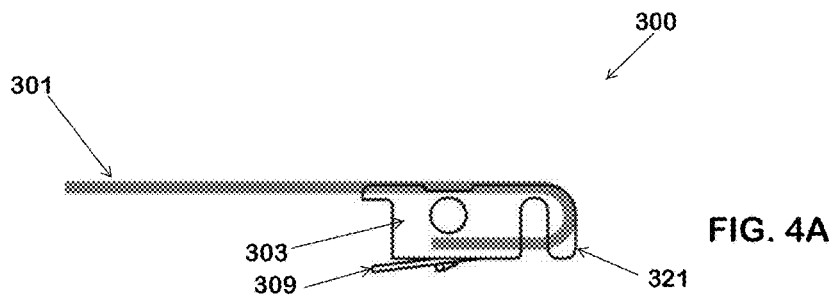
FIGS. 4A-4G show a breakdown of FIG. 2B showing a butterfly connection clip with book arm, according to various embodiments.
Figure 4B:
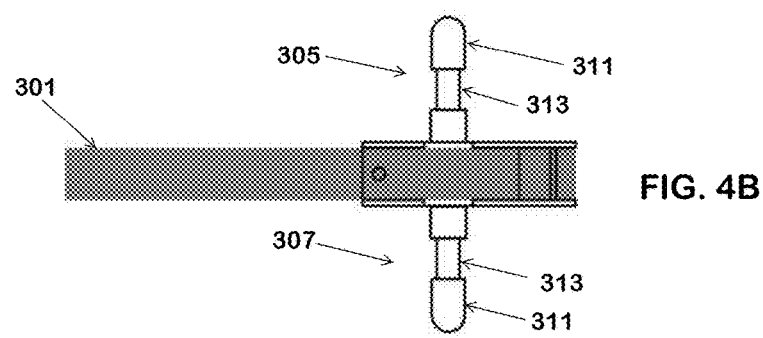
Figure 4C:
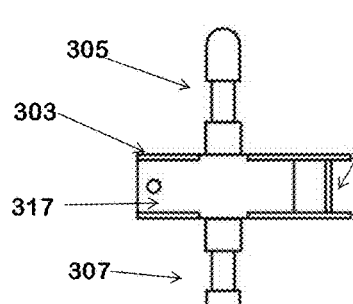
Figure 4D:
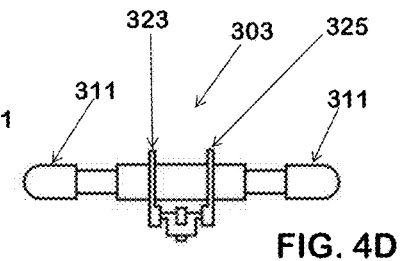
Figure 4E:
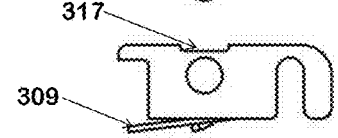
Figure 4F:
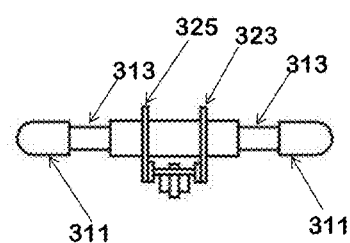
Figure 4G:
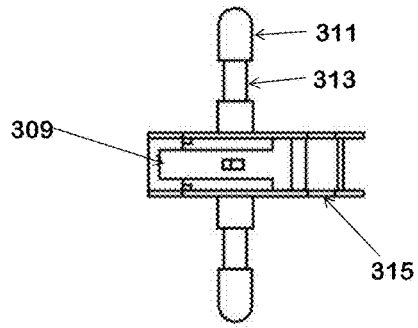

FIG. 1 shows embodiments of the multiple wiper blade system and assembly mounted on a truck. On the left side, two wiper assemblies 101, 103, connected using a double connection assembly 200 with a connecting post type wiper arm ("wiper post arm") 201, according to various embodiments is disclosed. On the right (driver's) side, four wiper assemblies 101, 103, 105 and 107 we shown connected (quad assembly) using a butterfly assembly connector 300 with a connecting hookslot type wiper arm (wiper hook arm) 301. Known wiper assemblies attach to a vehicle by way of a connecting arm. This connecting arm drives the movement of the wiper assembly. The disclosed system and assembly facilitates the use of multiple wiper blade assemblies with known connecting arms. One end of the connecting arm attaches to the vehicle, while the other end terminates in a wiper assembly attachment end. The attachment end is typically a hookslot-type (a hook) 301 or a post-type (a post) 201 arm. It should be noted that four assemblies may be of use, in particular with the more vertical windshields of large trucks such as that illustrated in FIG. 1. While a first, second, third, or fourth assembly is described, it should be understood that the numbering of the assemblies may be interchangeable—i.e. the first assembly may be provided in place of the third, the second in the place of the fourth, etc. In addition, while four wiper assemblies may be disclosed, variations thereon (one, two, three wiper assemblies) should be contemplated as within the scope of this disclosure.

The wiper assemblies shown in FIG. 1 may include one or more scraper blades 500, 503. For example, on the left, where a first wiper assembly 101 and second wiper assembly 103 are shown, one wiper assembly may have a traditional squeegee-type (elastomeric squeegee) blade while the other may have a scraper blade 503 (comprised of a stiffer material) as further described herein. By using the combination of scraper blade 503 and squeegee blade, superior cleaning functionality can be achieved. The scraper blade 503 may also have a water (windshield wiper fluid) conductivity feature or channel 517 and aperture(s) 505 as described further herein. Therefore, in operation, the scraper blade 503 may dislodge debris and lubricate the debris removal through direct provision of windshield wiper fluid, while the squeegee blade may wipe away the loosened material facilitated by the fluid. In addition, in various embodiments, the additional assembly (assemblies) e.g. 503 may optionally be removed when a driver no longer expects inclement weather or debris.

FIGS. 2A-2D show a summary of various embodiments of the multiple wiper blade system and assembly. A number of windshield wiper assembly connectors including a single assembly connector 400 (single connection clip) with hook arm 301, butterfly connection assembly 300 with hook arm 301, and a double connection assembly 200 (double connection assembly clip) with post arm 201, along with a scraper blade 503 with water channel ("channel") are all illustrated. The conventional hook arm 301 and post arm 201 ends are shaded, to be distinguishable from the rest of the assemblies which illustrate the present invention. Each of these will be individually described further herein. The illustrated single connection assembly 400, butterfly connection clip 300, and double connection assembly 200 may be understood generally as "windshield wiper assembly connectors" or "clips" for use with wiper assemblies. The use of a single connector for attachment of a single wiper blade to an arm is generally known in the art. For example, U.S. Pat. No. 5,885,023 (the '023 patent) to Witek discloses a windshield wiper blade connector that is generally used in the art and is hereby incorporated by reference for background purposes.

FIGS. 3A-3G show exemplary embodiments of a windshield wiper assembly connector according to various embodiments. The windshield wiper assembly connector may be a double connection assembly 200 or clip. The first top view shows a post arm 201 disposed in cross-section within the double connection assembly 200 or windshield wiper assembly connector. As can be seen, the post arm 201 is accepted by way of a post-receiving aperture (or hole) in a side wall 207 of the double connection assembly 200 clip. The clip or connector may comprise two sets of sidewalls 207. The sets of sidewalls 207 may include two external side walls 206 and two internal side walls 208. The side walls 207 may each define an aperture 217. The aperture 217 may provide for a snug fit of the pin, for example, the internal sidewalls 206 may provide for a snug fit of the rounded end of the pin connector or post arm 201. The aperture 217 in each side wall 207 may align with the aperture in the other sidewalls 207; in other words, the apertures 217 may be aligned. The post arm 201, in various embodiments, may be held inside of the clip 200 by way of a moveable beam 209 in the same manner as the post arm 201 connector of the Witek '023 patent.

The top of the windshield wiper assembly connector, according to various embodiments, may feature, in various embodiments, a push-button release 205, which may be connected to a push button beam 219, which may engage an end of the moveable beam 209. The moveable beam 209 may feature a fastening surface 211 for engaging the post arm 201. When pressed, the push-button release 205 may facilitate disengagement of the post arm 201 for removal of the arm or post. The connector or clip 200, in various embodiments, as previously noted, features sidewalls 207. These sidewalls 207 may be disposed inside of the wiper assembly 101, 103, 105, 107 upon installation, with a receiving overhang 223 engaging the wiper assembly. In various embodiments, an internal surface of the receiving extension 221 may be shaped as a snap-fit latch which engages the wiper assembly for secure fit.

A push-button release 205 can be seen featured on the top surface of the connector. The double connection assembly 200 clip or connector, in various embodiments, is sized to accept or connect two wiper assemblies (e.g. 101, 103, 105, 107). The push-button release 205 can be found disposed of on one side of the clip 200 in various embodiments, as the clip 200 can, in various embodiments, accept a first connector arm 201. The double connection assembly clip or connector 200 may be provided on a pin-type connector or post arm 201. As can be seen, the push-button release 205 may be provided on the pin-type or connector or post arm 201. An aperture 217 may be provided in the side wall 207 of the connector 200 on the same side as the pin-type or post-type connector wiper arm 201.

A clip or connector 200 such as that shown in FIGS. 3A-3G may be provided on a first wiper assembly 101 and second wiper assembly 103. A push-button release 205 may be provided on a left side (or right side) of the double connection assembly clip or connector 200. A post arm 201 for connection to a vehicle may be disposed onto and/or inside of the double connection assembly clip or connector 200 for connection of the post arm 201 to a first wiper assembly 101. The double connection assembly 200 clip or connector may similarly engage the second wiper assembly 103 to the first wiper assembly 101 and post arm 201. It should be understood that a post arm 201 connects a wiper assembly to a conventional vehicle wiper arm. Therefore, the double connection assembly 200 clip or connector facilitates the use of a second wiper assembly 103 with a first wiper assembly 101 for connection to a vehicle. A double connection assembly 200 clip or connector may engage a first wiper assembly 101 and second wiper assembly 103. A push-button release 205 may be provided on a left side of the double connection assembly 200 clip with a post arm 201 engaged by the button inside of the double connection assembly 200 clip and first wiper assembly 101. In addition, a windshield wiper fluid hose may be connected to a wiper assembly. The windshield wiper fluid hose may be connected to a wiper fluid reservoir or supply line inside of the vehicle.

FIGS. 4A-4G shows a windshield wiper assembly connector comprising a butterfly connection assembly 300 (butterfly assembly connector clip or connector), according to various examples of embodiments. Looking to a first side view provided of the butterfly connector assembly 300 connected on a wiper hook arm 301, the shaded hook arm 301 is shown engaging the connector or clip 300. The shaded wiper hook arm 301 may be seen engaging the receiving extension 321 and moveable beam 309 provided on the clip 300, in various embodiments. A first pin 305 and second pin 307, which may be axially connected, may be seen protruding from opposing sides of a clip or connector 300 body. The first pin 305 and second pin 307 may each have a groove 313 and a rounded end 311. The clip or connector 300 may have a hook-engaging channel 317, which may comprise a recessed surface sized to accept a standard hookslot wiper arm (wiper hook arm 301). The moveable beam 309 may engage the wiper hook arm 301 in the same manner as illustrated in the reference Witek et al. '270 patent. The first pin 305 and second pin 307 may be adapted to engage a first and second wiper assembly 103 in the same manner as illustrated in FIG. 3 and described above.

A butterfly assembly connector clip 300, according to various embodiments, may include a hook-engaging channel 317 disposed between two raised sides 323, 325 leading to a receiving extension 321 for acceptance of a hook of a wiper hook arm 301. The first pin 305 and second pin 307 may each include a rounded end 311 and groove 313 for acceptance of a first wiper blade assembly 101 and second wiper blade assembly 103. The butterfly assembly connector clip 300 may be attached to a wiper hook arm 301 (i.e. a hookslot-type wiper arm). The hook arm 301 may be engaged within the hook-engaging channel 317 for attachment of the clip to the vehicle by way of the wiper hook arm 301. The butterfly connection clip or connector 300 may therefore connect or facilitate the attachment of two wiper assemblies 101, 103 to a wiper hook arm 301. The rounded end 311 of the first pin 305 and the rounded end 311 of the second pin 307 may protrude from or into the first wiper assembly 101 and second wiper assembly 103, respectively. The groove 313 may be understood as engaged inside of the wiper blade assembly clip.

It should be understood the butterfly connection clip 300 has additional advantages. For example, the butterfly connection clip 300 may be used with any wiper assembly that accepts a connection pin. This means differently sized wiper assemblies may be matched together; the wiper assemblies need not be identical. Differing sizes or shapes may be used with the butterfly connection clip 300.

FIGS. 5A-5G illustrate a windshield wiper assembly connector comprising various embodiments of a single connection assembly clip or connector 400 (single connection assembly adapter clip or connector with post arm adapted for attachment to a wiper). The single connection assembly clip or connector 400 may be suitable for use with a hookslot-type wiper arm (wiper hook arm) 401. Various views of the single connection assembly clip or connector, according to various embodiments, apart and with a wiper hook arm 401 are shown. The single connection assembly clip or connector 400 may be used to transform a wiper hook arm 401 into a pin arm—i.e. to enable pin-type connection for a hookslot-type arm. This advantageously may allow use of the double connection assembly post arm clip or connector 200 with a hookslot-type wiper arm (wiper hook arm)

401. The single connection assembly clip 400 has a first side 407 and a second side 408 defining a hook-engaging channel 417, as well as a pin 405 with a rounded end 411 and groove 413. The wiper hook arm 401 engages a hook engaging channel 417 on the single connection assembly clip or connector 400 as well as a receiving extension 421. The hookslot arm 401 may also be held in place by a moveable beam 409 provided on a bottom of the single connection assembly clip or connector 400.

The single connection assembly clip or connector 400 may include a pin 405 having a rounded end 411 and groove 413 and may be coupled to a side (for example a first or second side). A hook engaging channel may be provided between the first side 407 and second side 408, which may be raised, to define a receiving extension 421. In various embodiments, an internal surface 415 of the receiving extension 421 may be shaped as a snap-fit latch to engage a wiper assembly for a secure fit. The single connection assembly clip or connector 400 may be connected to a wiper hook arm 401. The hookslot wiper arm 401 may be provided within the hook engaging channel, and the pin having a rounded end and groove may be provided into a wiper assembly. The pin 405 may be used to engage a wiper assembly and a windshield wiper connection assembly such as a double connection assembly 200.

FIGS. 6A and 6B show the single connection assembly 400, double connection assembly 200, and butterfly connection assembly 300 used to connect a first and second wiper assembly 101, 103. In FIG. 6A, the single connection assembly clip 400 and double connection assembly 200 clip may be used together to connect a first wiper assembly 101 and second wiper assembly 103 to a wiper hook arm 401. The wiper hook arm 401 may be engaged with the single connection assembly clip 400, with the pin of the single connection assembly clip engaging a first wiper assembly 101. The double connection assembly clip 200 then may attach a second wiper assembly 103 to the first wiper assembly 101. It may be understood that the hookslot wiper arm 401 engages the hook engaging channel and receiving extension, as well as the moveable arm, for attachment of the hookslot wiper arm to the single connection assembly. The pin may be engaged within the first wiper assembly 101, which is provided with the double connection assembly 200 clip. The pin of the single connection assembly clip may engage the moveable beam of the double connection assembly 200 clip, attaching the single connection assembly clip 400 to the double connection assembly 200 clip. In various embodiments, the moveable beam may be sized to fit within the groove of the pin. The double connection assembly 200 clip may then in turn engage the first and second wiper assembly 103. The receiving extension may be shaped as a snap-fit latch which engages the wiper assembly for secure fit.

In FIG. 6B, a first wiper assembly 101 and second wiper assembly 103 may be connected together by a butterfly connection clip, which may also be attached to a hookslot wiper arm 301. The first pin and second pin may engage a first wiper assembly 101 and second wiper assembly 103, with the rounded end of the first pin protruding into the first wiper assembly 101 and the rounded end of the second pin protruding into the second wiper assembly 103. In various embodiments, the first pin and second pin may engage standard clips provided within the first wiper assembly 101 and second wiper assembly 103.

A double connection assembly 200 clip and butterfly connection clip may be used to connect a first, second, and third wiper blade assembly. A rounded end 311 of a pin 305 of the butterfly connection clip 300 may protrude into the first wiper blade assembly 101. The butterfly connection clip 300 may engage a standard clip provided within the first wiper blade assembly 101. A hookslot arm (wiper hook arm such as 301 or 401) may connect to the butterfly connection clip 300 for connection of the three wiper blade assemblies (101, 103, 105) to a vehicle. A double connection assembly 200 clip may engage a second wiper blade assembly 103, which may be attached to a third wiper assembly by way of the double connection assembly 200 clip. The push-button release 205 of the double connection assembly 200 clip may engage or disengage the double connection assembly 200 clip from a pin provided on the butterfly connection clip. The double connection assembly 200 clip may, in various embodiments, attach to the second 103 and third 105 wiper blade assemblies by way of the internal surface of the receiving extension or snap-fit latch. A windshield wiper fluid hose 509 may attach to the second wiper blade assembly 103, which connects to a wiper fluid mechanism provided in the vehicle by way of a valve or fitting 507.

FIGS. 7A-7C show a wiper assembly 101 with a scraper blade 503. The scraper blade 503 may be attached to the wiper assembly 101 by way of an attachment surface 510, the shape of which can be seen in the scraper profile detail. The scraper blade 503 may include a scraping surface 512, which may include a narrowed section with a thinner profile than the remainder of the scraper blade 503. In various embodiments, the scraper blade 503 may be formed of a stiff plastic material. This material may be similar to the plastic used in known wiper blade assemblies which carry or hold a squeegee-type blade. The scraper blade 503 plastic should be strong enough to pick up debris, but not scratch the windshield. For example, the scraper blade 503 could be formed of high-density polyethylene (HDP or HDPE), polypropylene (PP), or polyvinyl chloride (PVC). The scraper blade 503 may be hollow, providing a channel 517 for water or washer fluid to flow. This functionality may be facilitated by a water connection fitting 507 or valve which can connect the channel to a vehicle washer fluid supply system by way of a fluid supply hose 509. The scraper blade 503 may have a number of apertures 505 distributed throughout the length of the scraper blade 503. The apertures 505 allow for the distribution of washer fluid at set intervals along the surface of the blade 503. This system further allows for more direct distribution of the washer fluid along the surface of a windshield. The scraper blade 503 may be made by a plastic extrusion process.

FIGS. 8A-8C show drawings of a number of exemplary embodiments of the scraper blade 503 provided on a standard wiper assembly. The apertures, scraper blade 503, water connection, fitting, and an exterior of the channel within the blade may be seen. The scraper blade 503 may be provided on a standard wiper assembly 101. Blade attachment arms may be provided on the standard wiper blade assembly 101 engage the scraper blade 503 attachment surface 510. In use, a user may snap or slide the scraper blade 503 by the attachment surface 510 into the blade attachment arms of the standard wiper blade assembly 101. The scraper blade 503 may be provided on the standard blade assembly by way of the scraper blade 503 attachment surface 510 and standard blade assembly attachment arm. A water connection valve or fitting 507 may engage a standard fluid hose 509 of a vehicle; the water connection valve or fitting 507 may allow wiper fluid to enter the channel 517 of the scraper blade 503 and exit the apertures 505. While apertures 505 may be shown along the length of only on one side of the blade 503, it should be understood the apertures 505 may be positioned on either or all sides of the scraper blade 503. A narrowed scraping surface 512 of a scraper blade 503 may also be provided. FIG. 8 (i.e. FIGS. 8A-8C) shows a number of embodiments of the scraper blade 503. Several options for assembly are shown. The embodiments may be described in parts 8A-8C. In part 8A of FIG. 8, the scraper 503 is shown in two parts: an attachment portion 522 and a scraping portion 524. It should be understood these pieces may be constructed of two pieces of original parts from a wiper manufacturer used to hold a squeegee-type blade. Therefore, this arrangement may allow for ease in manufacturing and require no modification of machine tooling. Prior to connecting both pieces, the connection portion 522 may be substantially used for the same purpose without a squeegee blade, in various embodiments. The scraper portion 524 may be a version of the attachment portion turned 90 degrees and modified for supplying fluids and scraping the windshield. In part 8B of FIG. 8, an assembled scraper blade 503 of 8A is shown, according to various embodiments of the invention. The attachment portion, scraping portion, channel, apertures, fitting, and water supply may all be seen. As can be ascertained, the attachment portion may be connected to the scraping portion, and the fitting provided into the scraping portion. The water supply from the vehicle may be attached to the fitting. In 8C, a single unitary version of the scraper blade 503 is shown. It should be understood this version of the scraper blade 503 may be extruded as one piece, which may likewise be achieved without undue complexity or additions to the manufacturing process.

A blade attachment portion 522, 510 may be provided on a standardized blade assembly to hold the scraper blade 503 in place on the standard wiper blade assembly 101 by way of the scraper blade 503 attachment surface 522, 510. The water connection valve or fitting 507 may lead into (or be in communication with) a channel 517 provided inside of the scraper blade 503. Several blade attachment arms may be provided on the standard wiper blade assembly. The blade attachment arms and blade attachment end of the standard wiper assembly may hold in place the scraper blade 503 by way of the attachment surface 522, 510. The attachment surface 510 or attachment portion 522 may further comprise sliding connection wings 520. The sliding connection wings 520 may allow for engagement of the standard wiper assembly arm. The sliding connection wings 520 may allow for easy attachment, in various embodiments, of the scraper blade to a standard wiper assembly.

Therefore, the scraper blade 503 may allow for the provision of a stiff scraping surface 512 on a standard wiper blade assembly. The stiff scraping surface 512 may allow for dislodging debris on the vehicle.

The scraper blade 503 may be formed of a number of materials; in particular the scraper blade 503 may in various embodiments be entirely formed of a stiff plastic. The scraper blade 503 may be formed by a plastic extrusion process, in various embodiments, which normally will have attachments for or flanges dimensionally similar to those of standard wiper blades to similarly engage the wiper arms. The scraper blade 503 may be optionally formed by a single extrusion process.

The scraper blade 503 may be connected to the standard windshield wiper fluid system of a vehicle. It should be understood that the vehicle wiper fluid connection system may be optionally provided in some standard implementations within the wiper attachment arm. The scraper blade 503 may allow for the attachment of the windshield wiper fluid hose 509 into the scraper blade 503 by way of the fluid valve or fitting 507. The fluid hose 509 may be attached to the valve 507 on one of multiple (e.g., two, three, or four) connected wiper blade assemblies 101, 103, 105, 107. A connected assembly having two wiper blade assemblies may include a connected scraper blade 503 and water connection valve or fitting 507. The water connection valve 507 can be attached to a first 101 or second wiper blade assembly 103. The first 101 and second wiper blade assemblies 103 may be attached by way of a butterfly connection clip 300. The windshield wiper fluid hose 509 may be accessible on an underside of a hookslot type wiper arm 301. The wiper fluid hose 509 may be attached to the water connection valve or fitting 507 provided on the scraper blade 503. The scraper blade 503 and standard squeegee blade may have differing heights. The elastomeric material and shape of the squeegee blade may allow for flexing of the squeegee blade tip during operation of the wiper. In contrast, the stiffer scraper blade 503 material may not bend height-wise (the scraper blade 503 may flex with the contour of the vehicle windshield along the length of the blade, however). Therefore the variance in height between scraper blade 503 and squeegee blade may allow for the scraper blade 503 (scraper blade 503 engaging surface) to efficiently scrape, and the squeegee blade to wipe the scraped debris.

The multiple blade assembly system and scraper blade 503 disclosed has a number of advantages. The cleaning functionality of a prototype embodiment of the invention appears superior to that of known wiper blades. The scraper blade 503 disclosed may provide a more efficient use of wiper fluid, allowing for spray along the length of the wiper blade using the apertures. The apertures allow for direct distribution of the wiper fluid. In addition, the scraper blade 503 can dislodge material that is difficult for known elastomeric squeegee blades to remove. Testing shows the performance of an example embodiment of the multiple wiper blade assembly herein (including scraper blade 503 and an elastomeric squeegee blade), is superior to that of a known elastomeric squeegee blade assembly alone. For example, in comparison testing, the cleanliness using the disclosed assembly (scraper plus squeegee) provides a sharp reflection whereas the known assembly (squeegee only) leaves a substantial amount of debris.

The multiple wiper blade assembly system and scraper blade are believed to be easier to manufacture using known manufacturing mechanisms and materials. The windshield wiper assembly connectors (i.e. 200, 300, 400) may be formed of similar materials to standard clips (extruded plastic, for example) or standard wiper arm connection elements (e.g., the posts/pins of the butterfly connection clip 300 and/or single connection assembly 400 could be formed of metal). In particular, the disclosed multiple wiper blade assembly system provides enhancements to known mechanisms. The windshield wiper assembly connectors (200, 300, 400) and scraper blade 503 allow for inexpensive and easy removal of additional blade assemblies and alternate blade type.

In various embodiments, the scraper blade 503 may be used on one assembly while a standard squeegee blade is used on another assembly. The scraper blade 503 may dislodge the material, while the squeegee may then carry the dislodged material off of the windshield surface. In addition, the fluid distribution functionality may assist in providing lubrication for scraper blade 503 and squeegee blade behavior. In this way, a multi-blade system using the assembly including the scraper blade 503 as disclosed herein offers superior cleaning functionality.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A multiple windshield wiper assembly comprising:
   a first wiper assembly having a squeegee blade;
   a second wiper assembly having a scraper blade, the second wiper assembly being coupled to the first wiper assembly by a windshield wiper assembly connector;
   wherein the scraper blade comprises an attachment for engagement to said second wiper assembly, a scraper surface for engaging a windshield, a channel for conducting wiper fluid, a plurality of apertures for disbursement of the wiper fluid onto a windshield, and a water connection fitting for connection of the scraper blade to a vehicle water supply hose;
   wherein the windshield wiper assembly connector comprises:
   two pairs of sidewalls, each sidewall defining an aperture sized to receive a pin of a pin wiper arm;
   a top surface engaging the two pairs of sidewalls and having a first and second receiving overhang;
   a moveable beam positioned relative to the apertures in the side walls so that the beam will engage a pin wiper arm pin when the pin is received in the apertures to secure said windshield wiper assembly connector to the pin in pivotable relation;
   a push-button release for disengaging the moveable beam to enable quick release of said windshield wiper assembly connector from the pin wiper arm pin; and
   a first receiving extension sized to receive a connection feature of a first wiper assembly and a second receiving extension sized to receive a connection feature of a second wiper assembly;
   wherein the first and second receiving extensions each feature a first and second internal surface for respective attachment of the first wiper assembly and second wiper assembly.

2. The multiple windshield wiper assembly of claim 1 further comprising:
   a single wiper assembly connector comprising a hookslot wiper arm receiver with a pin having a groove, whereby the said hookslot wiper arm receiver has a first side and a second side defining a hookslot wiper arm hook-engaging channel, and whereby the pin of said hookslot wiper arm receiver is engageable in the apertures of at least one of the two pairs of sidewalls of the said windshield wiper assembly connector, and is also engageable and releaseable by the said moveable beam, to removably secure the said sin k sidewall connector to the said windshield wiper assembly connector in pivotable relation.

3. The multiple windshield wiper assembly of claim 2, further comprising:
   a moveable beam provided on a bottom of said single assembly connector for holding a hookslot wiper arm in place within the said hookslot wiper arm hook-engaging channel.

4. An assembly having a windshield wiper assembly connector for use in connecting one or more windshield wiper assemblies to a pin wiper arm, the windshield wiper assembly connector comprising:

two pairs of sidewalls, each sidewall defining an aperture sized to receive a pin of a pin wiper arm;

a top surface engaging the two pairs of sidewalls and having a first and second receiving overhang;

a moveable beam positioned relative to the apertures in the side walls so that the beam engages the pin of the pin wiper arm when the pin is received in the apertures to secure the windshield wiper assembly connector to the pin wiper arm in pivotable relation;

a push-button release for disengaging the moveable beam to enable release of the windshield wiper assembly connector from a pin wiper arm;

a first receiving extension sized to receive a connection feature of a first wiper assembly and a second receiving extension sized to receive a connection feature of a second wiper assembly;

wherein the first and second receiving extensions each feature a first and second internal surface for attachment of the first wiper assembly and second wiper assembly, respectively;

the assembly further comprising:

a single assembly connector comprising a hookslot wiper arm receiver and a pin having a groove, whereby the said hookslot wiper arm receiver has a first side and a second side defining a hookslot wiper arm hook-engaging channel and whereby the in of said single assembly connector is engageable in the apertures of one of the two pairs of sidewalls of the said windshield wiper assembly connector and also in an adjacent aperture of an adjacent sidewall of the other pair of sidewalls of the said windshield wiper assembly connector to secure the said single sidewall connector to the aid windshield wiper assembly connector in pivotable relation.

5. A vehicle having the assembly of claim 4, wherein the assembly is connected to the vehicle by way of a hookslot wiper arm.

6. An assembly comprising a windshield wiper assembly connector for use in connecting one or more windshield wiper assemblies to a pin wiper arm, said windshield wiper assembly connector comprising:

two pint of sidewalls, each sidewall defining an aperture sized to receive a pin of a pin wiper arm;

a top surface engaging the two pairs of sidewalls and having a first and second receiving overhang;

a moveable beam positioned relative to the apertures in the side walls so that the beam has a first position wherein it engages the pin of the pin wiper arm when the pin is received in the apertures to secure the said windshield wiper assembly connector to the pin wiper arm in pivotable relation, and the beam may be depressed to a second position to disengage said pin to enable quick release of the windshield wiper assembly connector from a pin wiper arm;

a first receiving extension sized to receive a connection feature of a first winner assembly and a second receiving extension sized to receive a connection feature of a second wiper assembly;

wherein the first and second receiving extensions each feature a first and second internal surface for respective attachment of the first wiper assembly and second wiper assembly, respectively;

the assembly further comprising:

a scraper blade comprising:

an attachment surface for engaging a said wiper assembly;

a scraping surface for engaging a windshield;

a channel for conducting wiper fluid;

a plurality of aperture for disbursement of the wiper fluid onto a windshield; and a water connection valve for connection to a vehicle water supply hose.

7. The assembly of claim 6, wherein the windshield wiper assembly connector connects two wiper assemblies, one of said wiper assemblies including said scraper blade.

8. A vehicle having the assembly of claim 7, wherein the scraper blade is attached to a vehicle water supply hose by way of a fitting.

9. A windshield wiper assembly connector for use in connecting one or more windshield wiper assemblies to a pin wiper arm, the connector comprising:

two pairs of sidewalls, each sidewall defining a aperture sized to receive a pin of a pin wiper arm;

a top surface engaging the two pairs of sidewalls and having a first and second receiving overhang;

a moveable beam positioned relative to the apertures in the side walls so that the beam has a first position wherein it engages the pin of the pin wiper arm when the pin is received in the apertures in pivotable relation to secure said windshield wiper connector to the pin wiper arm pin and the beam may be depressed to a second position to disengage said pin to enable quick release of the windshield wiper assembly connector from a pin wiper arm;

a first receiving extension sized to receive a connection feature of a first wiper assembly and a second receiving extension sized to receive a connection feature of a second wiper assembly;

wherein the first and second receiving tensions each feature a first and second internal surface for attachment of the first wiper assembly and second wiper assembly, respectively; and wherein the said windshield wiper assembly connector is connected to two wiper assemblies.

10. A vehicle having the windshield wiper assembly connector of claim 9, wherein the windshield wiper assembly connector is connected to the vehicle by way of a pin wiper arm.

* * * * *

UNITED STATES PATENT AND TRADEMARK OFFICE
CERTIFICATE OF CORRECTION

| | | |
|---|---|---|
| PATENT NO. | : 10,065,605 B1 | Page 1 of 1 |
| APPLICATION NO. | : 15/601657 | |
| DATED | : September 4, 2018 | |
| INVENTOR(S) | : Petrowski et al. | |

It is certified that error appears in the above-identified patent and that said Letters Patent is hereby corrected as shown below:

In the Specification

In Column 3, Line 31, delete "book" and insert -- hook --, therefor.

In Column 3, Line 34, delete "book" and insert -- hook --, therefor.

In Column 3, Line 63, delete "we shown" and insert -- are shown --, therefor.

In the Claims

In Column 12, Line 55, in Claim 2, delete "sin k" and insert -- single --, therefor.

In Column 13, Line 34, in Claim 4, delete "aid" and insert -- said --, therefor.

In Column 13, Line 43, in Claim 6, delete "pint" and insert -- pairs --, therefor.

In Column 14, Line 2, in Claim 6, delete "winner" and insert -- wiper --, therefor.

In Column 14, Line 14, in Claim 6, delete "aperture" and insert -- apertures --, therefor.

In Column 14, Line 27, in Claim 9, delete "a aperture" and insert -- an aperture --, therefor.

In Column 14, Line 44, in Claim 9, delete "tensions" and insert -- extensions --, therefor.

Signed and Sealed this
Thirtieth Day of October, 2018

Andrei Iancu
*Director of the United States Patent and Trademark Office*